Sept. 8, 1925.  1,553,181
O. J. MANTHEY
WINDOW OPERATING DEVICE
Filed July 11, 1924    3 Sheets-Sheet 2
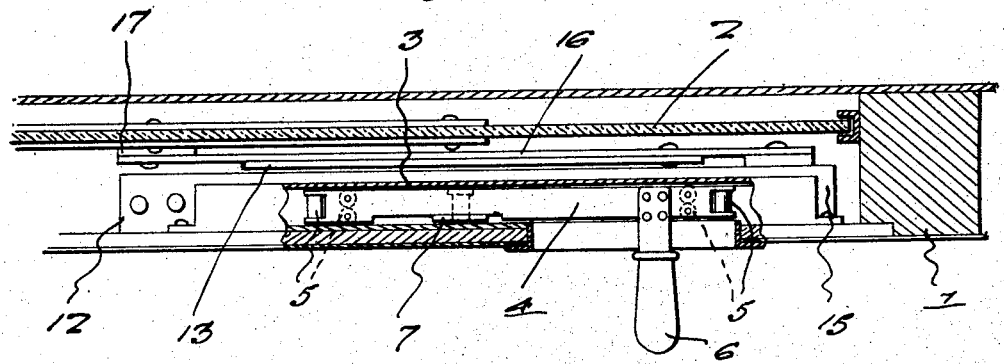
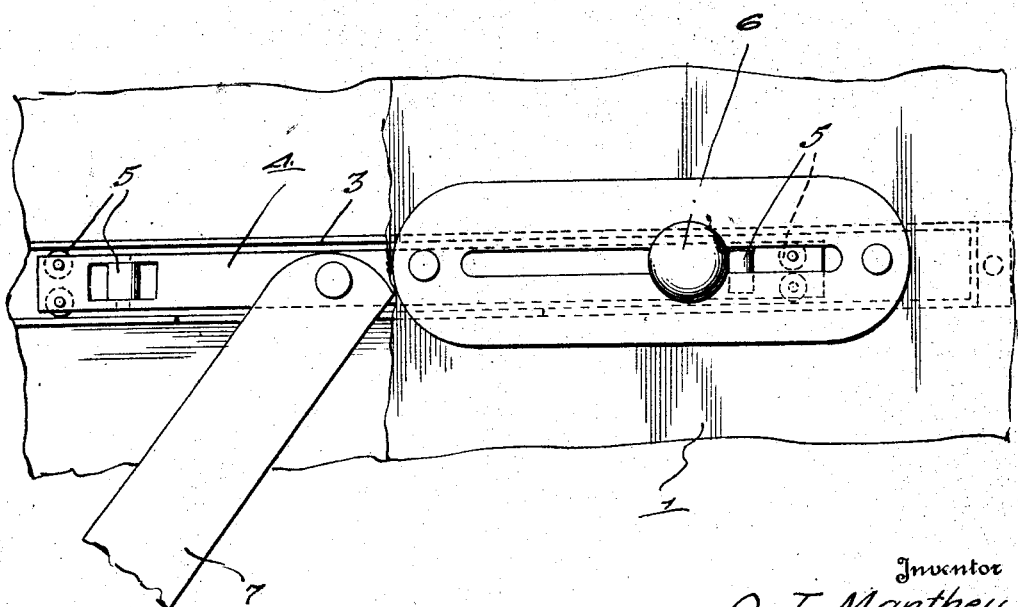
Inventor
O. J. Manthey
By Clarence A. O'Brien
Attorney

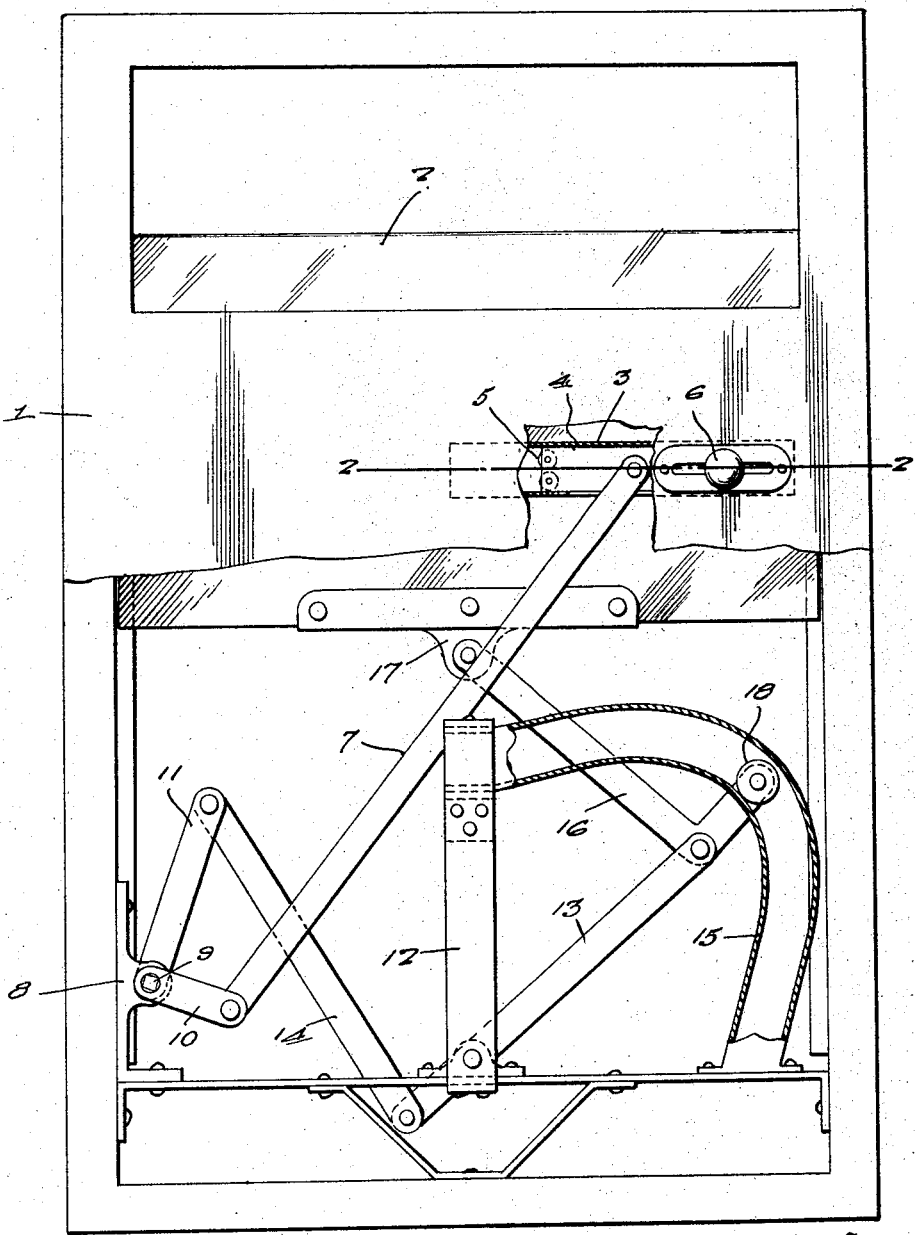

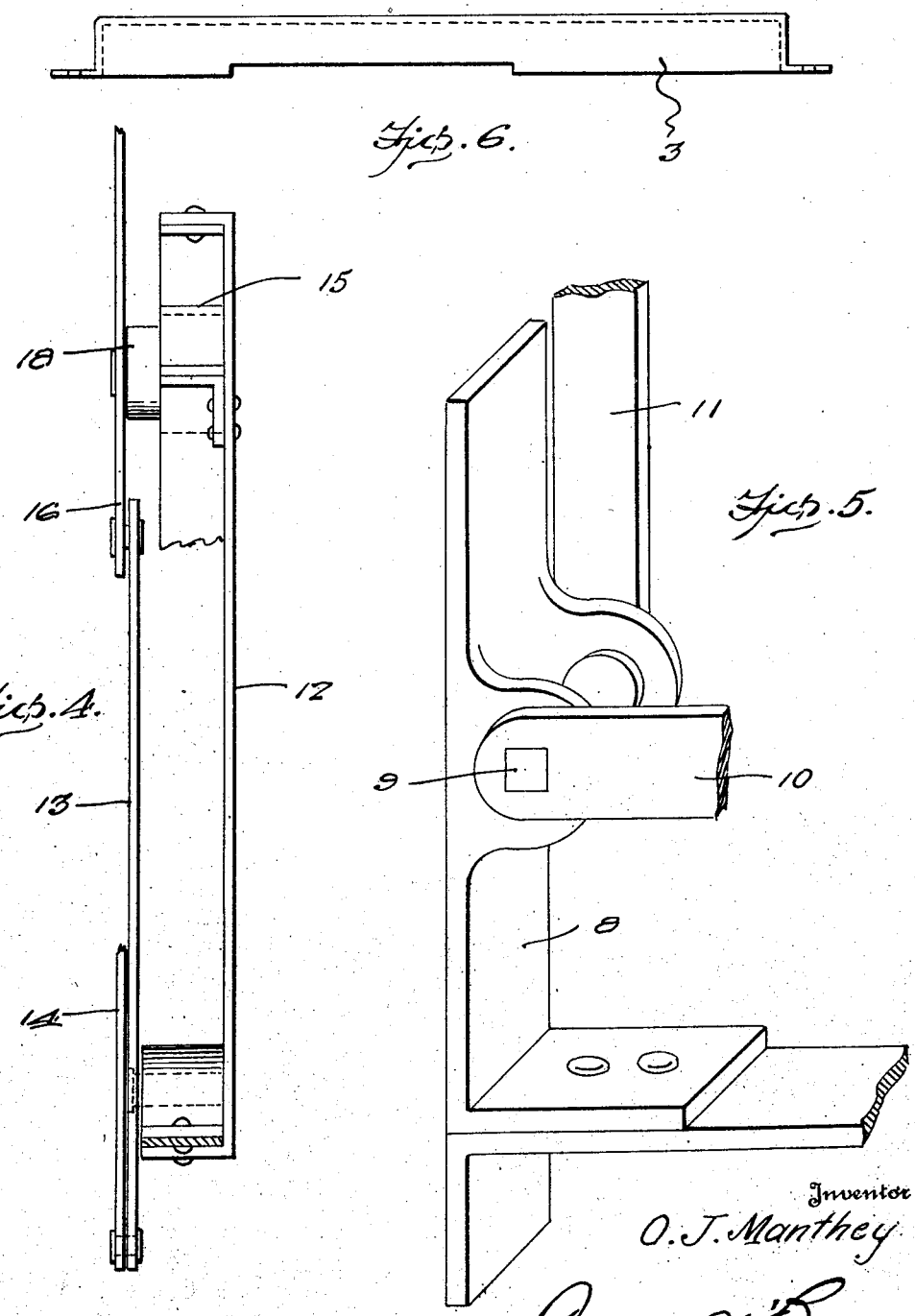

Patented Sept. 8, 1925.

1,553,181

UNITED STATES PATENT OFFICE.

OTTO J. MANTHEY, OF TOLEDO, OHIO.

WINDOW-OPERATING DEVICE.

Application filed July 11, 1924. Serial No. 725,430.

*To all whom it may concern:*

Be it known that I, OTTO J. MANTHEY, a citizen of the United States, residing at Toledo, in the county of Lucas and State of Ohio, have invented certain new and useful Improvements in a Window-Operating Device, of which the following is a specification.

This invention relates to window operating devices and it consists in the novel features hereinafter described and claimed.

An object of the invention is to provide a device of simple and durable structural arrangement especially adapted to be used for raising or lowering the window upon the body of a limousine automobile machine and with this object in view the structure includes a bar movably mounted in a casing and arranged to move transversely of the path of movement of the window as it is raised or lowered in the window frame. Compound leverage elements connect the bar with the window and are so arranged that but slight exertion is required to move the bar and effect the vertical movement of the window.

In the accompanying drawings:—

Figure 1 is a vertical side elevation of a portion of the body of an automobile machine with parts broken away and showing the window operating device applied thereto and with parts thereof in section.

Figure 2 is an enlarged fragmentary sectional view of the window operating device cut on the line 2—2 of Figure 1.

Figure 3 is an enlarged side elevation of the device shown in Figure 2 with parts thereof broken away.

Figure 4 is an edge view of the window operating device.

Figure 5 is a fragmentary perspective view of the window operating device.

Figure 6 is an edge view of a casing which serves as one of the component parts of the window operating device.

In the accompanying drawing, the door or frame of the body of the limousine is indicated at 1 and the window pane or panel at 2. The panel 2 is slidably mounted in the frame 1 in a usual manner. A casing 3 is secured in the frame 1 and is disposed transversely of the panel 2. A bar 4 is slidably mounted in the casing 3. Friction rollers 5 are journaled upon the bar 4 and engage the inner surfaces of the frame 3 whereby the said bar may be readily moved in the casing. A knob 6 is attached to the bar 4 and is disposed inwardly of the frame 1. A link 7 is pivotally connected at its upper end with the intermediate portion of the bar 4. A bracket 8 is fixed in the lower portion of the frame 1 and a shaft 9 is journaled in the said bracket. A crank arm 10 is carried at one end of the shaft 9 and the lower end of the link 7, hereinbefore described, is pivotally connected with the said crank arm 10. A crank arm 11 is also fixed to the shaft 9. A vertically disposed standard 12 is fixed in the lower portion of the frame 1 at a point substantially midway between the ends of the panel 2. A lever 13 is fulcrumed at a point between its ends to the lower portion of the standard 12. A link 14 is pivotally connected at its lower end with the lever 13 and pivotally connected at its upper end with the upper portion of the crank arm 11 hereinbefore described. A curved guide way is secured at one end to the upper portion of the standard 12 and secured at its opposite end to the lower portion of the frame 1. A lever 16 is pivoted at its upper end to a lug 17 mounted at the lower edge of the panel 2 and at point midway between the ends thereof. The lever 16 is provided with angularly disposed end portions and the upper end of the lever 13 is pivotally connected with the lever 16 approximately at the corner thereof. A roller 18 is journaled at the free end of the lever 16 and is arranged to travel or move between the sides of the guides 15. From the above description taken in conjunction with the accompanying drawings it will be seen that when the bar 4 is moved longitudinally in the casing 3 by using the knob 6, the link 7 is moved edgewise and through the crank arm 10 the shaft 9 in the bracket 8 is rocked. Therefore the arm 11 moves the link 14 longitudinally whereby the lever 13 is rocked upon its fulcrum and the lever 16 is moved longitudinally and the roller 18 moves along the curved side of the guide 15. As the lever 16 moves the panel 2 is raised or lowered in the frame and according to the direction in which the knob 6 is moved.

In the arrangement it will be observed that the knob and bolt 4 are moved transversely of the panel 2 and that the casing 3 and its contents is at the side of the panel 2; therefore these parts are arranged in overlapping position in the frame 1 and consequently the structure occupies but little space and the knob is accessible to the occupant of the body of the machine who is sitting at or near the window opening.

Having thus described the invention, what is claimed is:—

1. In combination with a window panel slidably mounted in a frame, a window operating device comprising a casing mounted upon the frame and disposed transversely of the panel, a bar slidably mounted in the casing, a bracket mounted in the frame, a shaft journaled in the bracket, crank arms provided at the ends of the shafts, a link operatively connecting one of the crank arms with the bar, a lever fulcrumed in the lower portion of the frame, a link operatively connecting the last mentioned lever with the other crank arm, a curved guideway located in the frame, a lever having angularly disposed ends, a roller journaled upon one end of the last mentioned lever and received in the guide way, the other end of the last mentioned lever being pivotally connected with the panels.

2. In combination with a panel slidably mounted in a frame, an operating device comprising a casing mounted upon the frame and disposed transversely of the panel, a bar slidably mounted in the casing, a standard mounted in the frame below the panel, a curved guide way connected at one end with the standard and at its other end with the frame, a lever having angularly disposed end portions one of which is pivotally connected with the panel, a roller journaled upon the upper end of said lever and received within the guide way, a lever fulcrumed upon the standard, said lever being pivotally connected at one end with the angular lever, a shaft journaled in the frame and having crank arms, a link operatively connecting one of the crank arms of the second mentioned lever and a link operatively connecting the other crank arm with the bar.

In testimony whereof I affix my signature.

OTTO J. MANTHEY.